United States Patent
Ahn

(10) Patent No.: US 8,833,112 B2
(45) Date of Patent: Sep. 16, 2014

(54) STATOR OF MOTOR AND WASHING APPARATUS HAVING THE SAME

(75) Inventor: In Geun Ahn, Changwon-si (KR)

(73) Assignee: LG Electronics Inc., Seoul (KR)

( * ) Notice: Subject to any disclaimer, the term of this patent is extended or adjusted under 35 U.S.C. 154(b) by 1576 days.

(21) Appl. No.: 12/308,421

(22) PCT Filed: Jun. 14, 2007

(86) PCT No.: PCT/KR2007/002871
§ 371 (c)(1),
(2), (4) Date: Oct. 7, 2010

(87) PCT Pub. No.: WO2007/145471
PCT Pub. Date: Dec. 21, 2007

(65) Prior Publication Data
US 2011/0016929 A1    Jan. 27, 2011

(30) Foreign Application Priority Data

Jun. 16, 2006 (KR) .................. 10-2006-0054502

(51) Int. Cl.
*D06F 37/30* (2006.01)
*H02K 1/18* (2006.01)
*H02K 1/14* (2006.01)
*H02K 15/02* (2006.01)

(52) U.S. Cl.
CPC .............. *H02K 1/148* (2013.01); *H02K 15/026* (2013.01); *H02K 1/146* (2013.01); *D06F 37/304* (2013.01)
USPC ...................................... 68/140; 310/216.043

(58) Field of Classification Search
USPC .................... 68/23 R, 24, 140; 310/216.043, 310/216.001, 216.007, 216.008, 216.009, 310/216.051, 216.057, 216.029
See application file for complete search history.

(56) References Cited

U.S. PATENT DOCUMENTS

| | | | | |
|---|---|---|---|---|
| 2,446,999 | A * | 8/1948 | Camilli | 336/178 |
| 3,043,971 | A * | 7/1962 | Stevens | 310/216.008 |
| 3,320,451 | A * | 5/1967 | Wiley | 310/216.042 |
| 4,080,724 | A * | 3/1978 | Gillette | 29/598 |
| 4,102,040 | A | 7/1978 | Rich | |
| 4,206,621 | A * | 6/1980 | Kawasaki et al. | 72/130 |
| 4,894,905 | A * | 1/1990 | Tanaka et al. | 29/598 |
| 5,457,350 | A * | 10/1995 | Sakamaki et al. | 310/216.043 |
| 6,121,711 | A * | 9/2000 | Nakahara et al. | 310/254.1 |
| 6,265,804 | B1 * | 7/2001 | Nitta et al. | 310/216.066 |
| 6,369,687 | B1 * | 4/2002 | Akita et al. | 336/234 |
| 6,538,548 | B2 * | 3/2003 | Akita et al. | 336/234 |
| 6,584,813 | B2 * | 7/2003 | Peachee et al. | 68/23.6 |

(Continued)

FOREIGN PATENT DOCUMENTS

| | | |
|---|---|---|
| CN | 1489261 | 4/2004 |
| DE | 873273 C | 4/1953 |

(Continued)

*Primary Examiner* — Joseph L Perrin
(74) *Attorney, Agent, or Firm* — McKenna Long & Aldridge LLP

(57) ABSTRACT

A stator of an electric motor and a washing apparatus having the same are disclosed. The stator includes a stator core, which has a plurality of bases stacked one above another after being wound, each base having a plurality of poles formed at one side surface thereof and a plurality of notches formed at the other side surface thereof. Each base is divided into at least two parts to be assembled with one another.

16 Claims, 7 Drawing Sheets

(56) References Cited

U.S. PATENT DOCUMENTS

| | | |
|---|---|---|
| 6,630,766 B1 | 10/2003 | Kirn et al. |
| 6,794,786 B2 * | 9/2004 | Enomoto et al. ........ 310/216.088 |
| 6,919,665 B2 * | 7/2005 | Murakami et al. ...... 310/216.043 |
| 6,924,575 B2 * | 8/2005 | Baumeister et al. ... 310/216.011 |
| 8,044,551 B2 * | 10/2011 | Kim ........................ 310/216.109 |
| 2001/0013168 A1 | 8/2001 | Asao et al. |
| 2003/0127938 A1 * | 7/2003 | Shen et al. .................... 310/216 |
| 2003/0234593 A1 | 12/2003 | Baumeister et al. |
| 2004/0068857 A1 | 4/2004 | Park et al. |
| 2004/0201304 A1 * | 10/2004 | Niimi et al. ................... 310/216 |
| 2005/0067912 A1 * | 3/2005 | Murakami et al. ............ 310/216 |
| 2005/0073211 A1 * | 4/2005 | Lee ................................ 310/216 |
| 2005/0127775 A1 * | 6/2005 | Lee et al. ...................... 310/216 |
| 2005/0189837 A1 * | 9/2005 | Lee ................................ 310/217 |
| 2006/0049713 A1 * | 3/2006 | Toide et al. ................... 310/217 |
| 2006/0261698 A1 * | 11/2006 | Lee ................................ 310/216 |
| 2007/0096587 A1 * | 5/2007 | Ionel et al. .................... 310/218 |

FOREIGN PATENT DOCUMENTS

| | | |
|---|---|---|
| DE | 1882067 U | 11/1963 |
| DE | 26 29 532 | 1/1977 |
| EP | 1 541 738 | 6/2005 |
| JP | 11-289695 | 10/1999 |
| JP | 2000-116037 A | 4/2000 |
| JP | 2002-354718 A | 12/2002 |
| JP | 2003-79081 A | 3/2003 |
| JP | 2004-236497 | 8/2004 |
| JP | 2005-039992 | 2/2005 |
| JP | 2005-130620 | 5/2005 |
| JP | 05-168128 | 6/2005 |
| KR | 2003-087775 | 11/2003 |
| SU | 1580491 A1 | 7/1990 |
| WO | WO 2005/081645 | 9/2005 |

* cited by examiner

Fig. 5
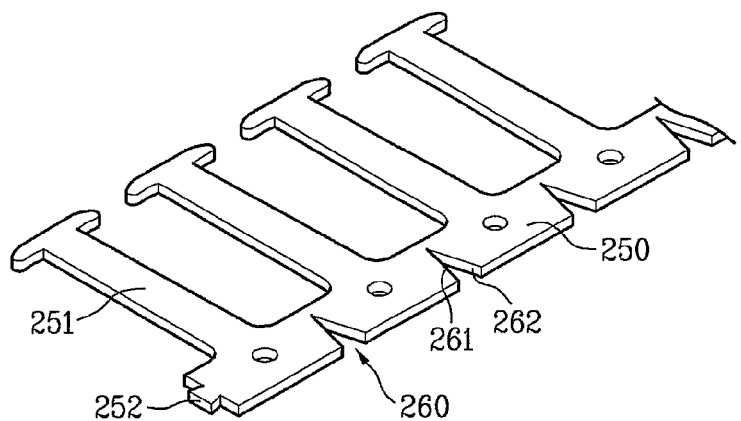
[Fig. 6]
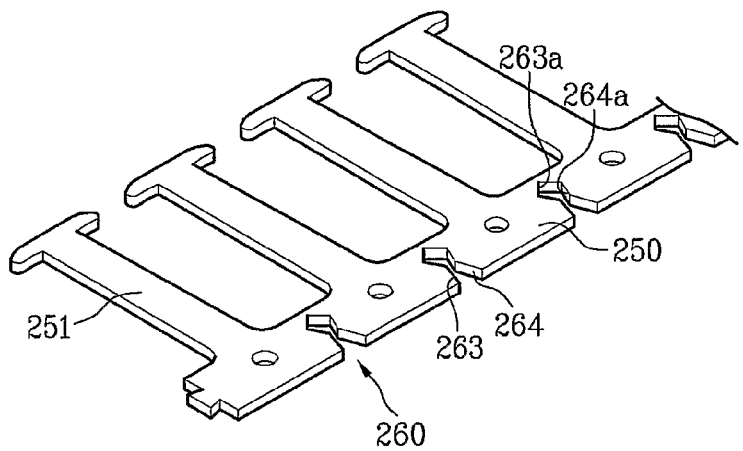
Fig. 7
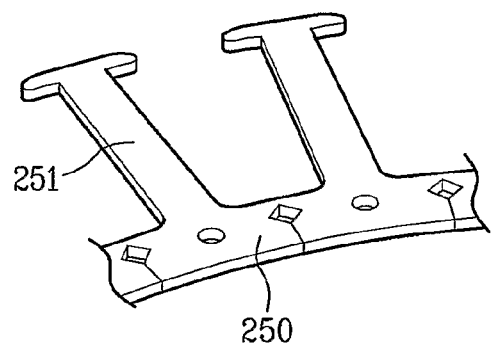
Fig. 8
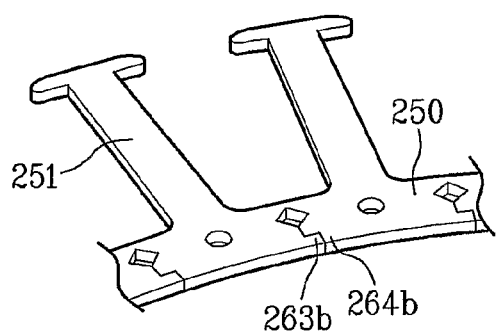

STATOR OF MOTOR AND WASHING APPARATUS HAVING THE SAME

CROSS REFERENCE TO RELATED APPLICATION

This application is a national stage entry of International Application No. PCT/KR2007/002871, filed on Jun. 14, 2007, and claims priority to Korean Application No. 10-2006-0054502, filed Jun. 16, 2006, both of which are hereby incorporated by reference as if fully set forth herein in their entireties.

BACKGROUND

1. Field of the Invention

The present invention relates to a stator for an electric motor and a washing apparatus having the same, and more particularly, to a stator for an electric motor, which can reduce the waste of materials of a stator core and furthermore, assure the use of simplified equipment, and a washing apparatus having the same.

2. Background Art

Generally, examples of washing apparatuses include a washing machine for washing laundry and a drying machine for drying wet laundry by use of high-temperature air. Both the washing machine and the drying machine are provided with a drum in which laundry is washed or dried, the drum being rotated by a motor. More particularly, in a drum washing machine that is recently in the spotlight of consumers, after a detergent, wash water, and laundry are put into a drum, the drum is rotated upon receiving a drive force from a motor such that the laundry, received in the drum, can be washed by use of a frictional force between the drum and the laundry. The drum washing machine has less damage to the laundry, and prevents entangling of the laundry while achieving excellent laundry washing effects by pounding and rubbing.

Conventional drum washing machines are classified, on the basis of a driving manner thereof, into an indirect-connection type in which a drive force of a motor is indirectly transmitted to a drum via a belt wound on a motor pulley and a drum pulley, and a direct-connection type in which a rotor of a BLDC motor is directly connected to a drum to directly transmit a drive force of the motor to the drum. Here, in relation with the former indirect-connection type drum washing machine in which the drive force of the motor is indirectly transmitted via the belt wound on the motor pulley and the drum pulley, rather than being directly transmitted to the drum, there are problems in that the loss of energy occurs in the course of transmitting the drive force and a great amount of noise is generated in the transmission of power.

Therefore, to solve the above described problems of the conventional indirect-connection type drum washing machine, the use of the direct-connection type drum washing machine using a BLDC motor is expanding. Now, the configuration of a conventional direct-connection type drum washing machine will be described in brief with reference to FIG. 1.

FIG. 1 is a longitudinal sectional view illustrating the configuration of a conventional drum washing machine. The conventional drum washing machine comprises a tub 2 installed in a cabinet 1, and a drum 3 rotatably installed in the center of the tub 2. A motor is coupled to a rear side of the tub 2. Specifically, a stator 6 of the motor is fixed to a rear wall portion of the tub 2, and a rotor 5 of the motor is axially connected to the drum 3 by penetrating through the tub 2 while surrounding the stator 6.

Although not shown, a metallic tub supporter is interposed between the rear wall portion of the tub 2 and the stator 6. The tub supporter has approximately the same shape as the outer contour of the rear wall portion of the tub 2. Once the stator 6 is coupled to the rear wall portion of the tub 2, the tub supporter is fixed to the rear wall portion of the tub 2, so as to support the load of the stator 6 while maintaining the concentricity of the stator 6.

The cabinet 1 is provided, at a front side thereof, with a door 21, and a gasket 22 is installed between the door 21 and the tub 2. A hanging spring 23 is installed between an inner ceiling surface of the cabinet 1 and an outer top surface of the tub 2, to support the tub 2. Also, a friction damper 24 is installed between an inner bottom surface of the cabinet 1 and an outer lower surface of the tub 2, to alleviate vibrations of the tub 2 caused during a dehydrating operation.

FIG. 2 is a perspective view illustrating the outer appearance of the stator provided in the washing machine of FIG. 1, and FIG. 3 is a perspective view illustrating a dividable core DC used in the stator of FIG. 2. As shown in FIGS. 2 and 3, the conventional stator core takes the form of an assembly of unit cores, the unit cores being stacked one above another and connected with one another in a circumferential direction thereof. Each of the unit cores is formed by pressing an iron plate, and includes a base 150, a plurality of poles 151 formed along an outer periphery of the base 150, and a plurality of protrusions 500 formed along an inner periphery of the base 150, each protrusion 500 having a coupling hole 500a. In addition to providing the coupling holes 500a required to couple the stator 6 to the rear wall portion of the tub 2, the protrusions 500 support a fastening force of bolts through the coupling holes 500a.

However, the above described conventional dividable core DC has several problems of, for example, the excessive loss of materials and a complicated manufacturing process. Specifically, in the manufacture of the dividable core DC, after each unit core is fabricated by pressing a single iron plate, a plurality of the fabricated unit cores have to be stacked one above another to form a core assembly. The stacked unit cores also have to be connected to one another in a circumferential direction thereof. With the above described press process of the unit cores, a large proportion of each iron plate is wasted, resulting in the excessive loss of materials. Further, due to the feet that the unit core is provided with the protrusions 500 at the opposite side of the poles 151, the amount of the iron plate required for the manufacture of the unit core increases, and the fabrication of the unit core is more complicated.

To solve the above described problems of the conventional dividable core, there has been developed a spiral core as shown in FIG. 4. The spiral core is formed by spirally winding each core iron plate and stacking a plurality of spirally wound core iron plates one above another.

As shown in FIG. 4, to form the conventional spiral core SC, two iron plates 11 are punched from a single electric steel plate 10. In the electric steel plate 10, specifically, the two iron plates 11 are included such that a pair of band-shaped bases 150 of the iron plates 11 face each other in a width direction of the spiral core SC and poles 151 protruding from the bases 150 are arranged alternately in two rows. In this way, if a plurality of iron plates 11 are prepared, the iron plates are rotated and spirally wound, respectively, and stacked one above another from the bottom to the top to have a multilayer structure.

Here, in the course of spirally rotating and winding the iron plates 11, to prevent the iron plates 11 from being unwound in an opposite direction of the rotating direction thereof or to prevent the respective stacked iron plates 11 from coming off the underneath iron plate 11, each pole 151 of the iron plates 11 is formed, at an upper surface thereof, with an engagement boss 154a, and at a lower surface thereof, with an engagement recess corresponding to the engagement boss 154a. Also, to reduce a winding stress applied to the iron plate 11 for the sake of facilitating the winding of the iron plate 11, the base 150 of the iron plate 11 is formed, at an inner periphery thereof, with vertical grooves 152 such that the vertical grooves 152 are located between the respective neighboring poles 151.

As described above, the iron plates 11 are punched, in two rows, from the electric steel plate 10, and the base 150 of each iron plate 11 has notches 150a having the same shape as that of distal ends of the poles 151 of the opposite iron plate 11. Each pole 151 of the iron plate 11 has ejector recesses 151d, to assure an easy separation of the punched two rows of the iron plates 11.

Once all the iron plates 11 are stacked one above another, rivets 153 are penetrated through holes perforated in the bases 150 of the iron plates 11, to couple the iron plates to one another by riveting. A winding beginning portion and a winding ending portion of each of the stacked iron plates 11 are bonded to predetermined positions of the respective contact bases 150 by welding.

The above described conventional spiral core has an advantage of eliminating the waste of materials because core iron plates, which are symmetrically arranged in two rows, are punched from a single electric steel plate. However, the punched core iron plates have a need for large-scale winding equipment.

BRIEF SUMMARY

Further, although the conventional spiral core assures a slightly simplified winding of the iron plates by virtue of the grooves 152, substantially, a primary object of the grooves 152 is to reduce a bending stress applied to the base during the winding of the iron plate, rather than to simplify the winding of the iron plate. Therefore, the conventional spiral core may be subjected to a heat treatment of the core iron plates for assuring an easy winding thereof. Such a heat treatment, however, has a need for additional heating equipment, thus deteriorating the large-size problem of equipment. Disclosure of Invention Technical Problem An object of the present invention devised to solve the problem lies on a stator of a motor, in which core iron plates are punched, in two rows, from a single electric steel plate to reduce the waste of materials, and also, the core iron plates can achieve a more easy winding thereof and be assembled in a dividable core shape, so as to eliminate a large-size problem of equipment, and a washing apparatus having the same.

The object of the present invention can be achieved by providing a stator for an electric motor comprising: a stator core including a plurality of bases stacked one above another after being wound, each base having a plurality of poles formed at a first side surface thereof and a plurality of notches formed at a second side surface thereof, wherein each base is divided into at least two parts to be assembled with one another.

To allow the second side surface of the base having the notches to form a continuous surface when the base is wound, facing cut surfaces of each notch may come into at least partial contact with each other.

Here, each notch may be located between the respective neighboring poles formed at the base, and may be formed at the second side surface of the base opposite to the first side surface of the base having the poles.

In the stator of the electric motor according to the present invention, at least one of the cut surfaces of the notch may have a recess. Preferably, the recess begins from a distal end of the cut surface opposite to the second side surface of the base having the notches.

Both the cut surfaces of the notch may have recesses, respectively, and the recess may have a polygonal or semi-circular shape.

Meanwhile, the cut surfaces may have a curved shape, and one of contact portions of both the cut surfaces may be formed with a protruded portion, and the other contact portion may be formed with a recessed portion corresponding to the protruded portion. Preferably, the base has assembling recesses and assembling protrusions, to allow the divided base parts to be assembled with each other.

Meanwhile, the stator of the electric motor according to the present invention may farther comprise: at least one reinforcing member for reinforcing the strength of the stator core and binding the plurality of bases stacked one above another.

The reinforcing member may be coupled to an inner periphery of the stacked bases.

Preferably, the reinforcing member is coupled to the bases by welding.

The reinforcing member may surround the bases including the inner periphery of the stacked bases. Both distal ends of the reinforcing member may be bent, or may have press-fitting portions, respectively, to be press-fitted into associated ones of the bases.

Meanwhile, the reinforcing member may have coupling portions formed with coupling holes for the coupling of the stator.

The at least one reinforcing member may include a plurality of reinforcing members.

In another aspect of the present invention, provided herein is a washing apparatus having a motor for rotating a drum receiving laundry therein, wherein a stator core of the motor includes a plurality of bases stacked one above another after being wound, each base having a plurality of poles formed at one side surface thereof and a plurality of notches formed at the other side surface thereof, and wherein each base is divided into at least two parts to be assembled with one another.

BRIEF DESCRIPTION OF THE DRAWINGS

The accompanying drawings, which are included to provide a further understanding of the invention, illustrate embodiments of the invention and together with the description serve to explain the principle of the invention.

FIG. 5 is a perspective view illustrating a core iron plate for the manufacture of a stator core according to a preferred first embodiment of the present invention.

FIG. 6 is a perspective view illustrating a core iron plate according to a preferred second embodiment of the present invention.

FIG. 7 is a perspective view illustrating a bent state of the core iron plate shown in FIG. 6.

FIG. 8 is a perspective view illustrating a bent state of a core iron plate according to a preferred third embodiment of the present invention.

DETAILED DESCRIPTION

Reference will now be made in detail to the preferred embodiments of the present invention, examples of which are illustrated in the accompanying drawings. Meanwhile, Wherever possible, the same reference numbers will be used throughout the drawings to refer to the same or like parts.

Figure 4:
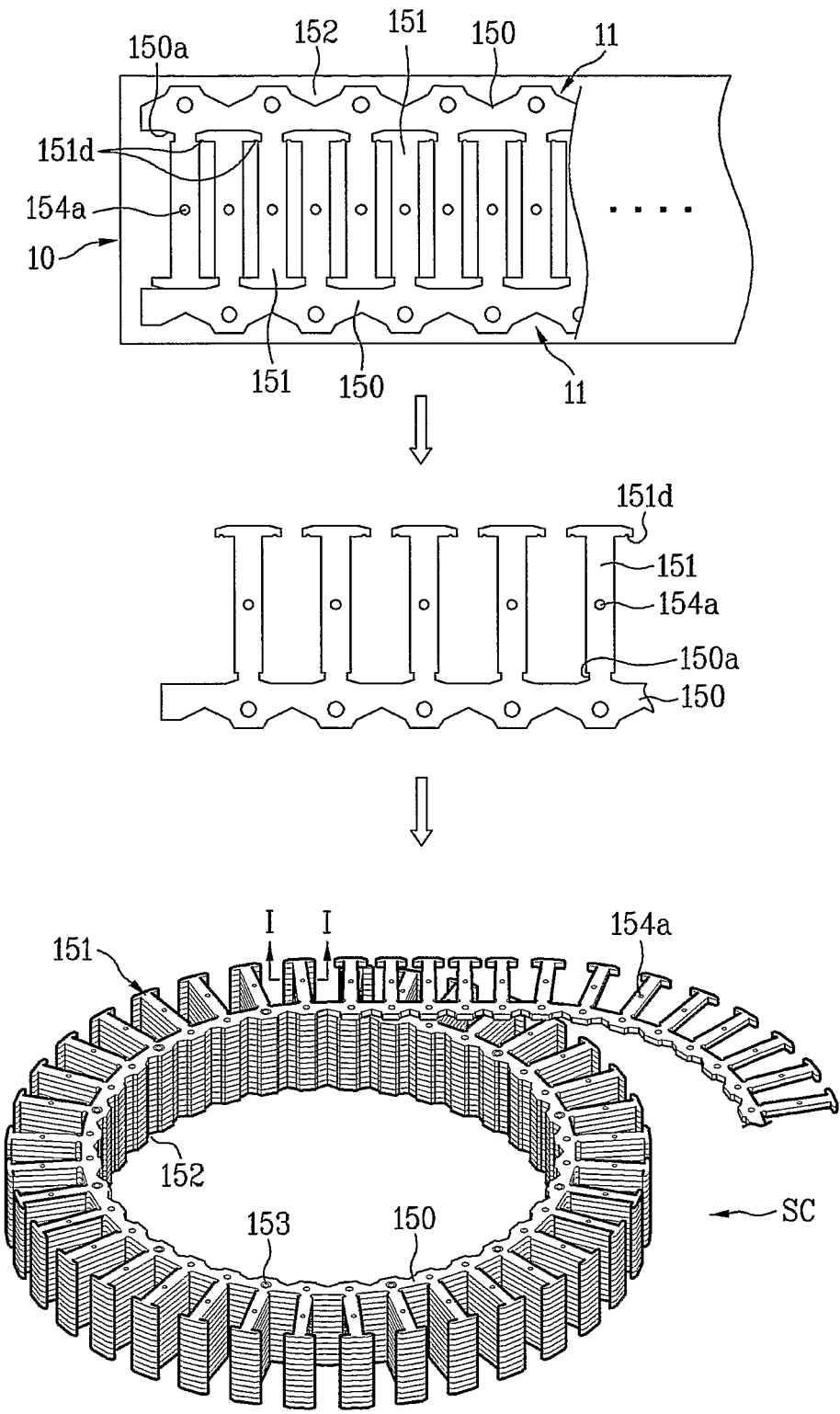
FIG. 4 is a perspective view illustrating a conventional dividable core.

FIG. 5 illustrates a core iron plate for the manufacture of a stator core according to a preferred first embodiment of the present invention. In the present embodiment, core iron plates can be punched, in two rows, from a single electric steel plate, in the same manner as shown in FIG. 4. As a plurality of core iron plates are wound and stacked one above another, a stator core having a predetermined height is completed.

As shown, the core iron plate according to the present invention includes a base 250, and a plurality of poles 251 extending from an outer periphery of the base 250. Here, although the base 250 and the plurality of poles 251 may be integrally formed with each other as shown, it should be appreciated that the base 250 and the poles 251 are prepared separately, and then, are assembled to each other.

To assure the assembling of the base 250 and the poles 251, assembling recesses and assembling protrusions used for the assembling of the previously described conventional dividable core may be formed at the base 250 and the poles 251. Here, the assembling protrusions may take the form of assembling protrusions 252 as shown in FIG. 5.

The base 250 is formed with V-shaped notches 260 each having a pair of cut surfaces 261 and 262. Once the core iron plate is wound, the cut surfaces 261 and 262 come into contact with each other.

FIGS. 6 and 7 illustrate a preferred second embodiment of the present invention in which cut surfaces 263 and 264 of each notch 260 have recesses 263a and 264a, respectively. As shown, the pair of cut surfaces 263 and 264 will come into contact with each other when the core iron plate is wound, and the recesses 263a and 264a have a triangular shape. Accordingly, once the core iron plate is wound, the recesses 263a and 264a of the cut surfaces 263 and 264 define a diamond shape as shown in FIG. 7. Each of the recesses 263a and 264a begins from a distal end of the associated cut surface 263 or 264 near the adjacent pole 261.

In the case of the notches 260 as shown in FIG. 5, there may be the problem in that the first cut surface 263 and the second cut surface 264 interfere with each other due to a processing error before the core iron plate is wound up to a desired curvature, thereby hindering the winding of the core iron plate. Such an interference problem of the cut surfaces 263 and 264 may be worsened toward the pole 251.

However, in the case of the notches 260 as shown in FIG. 6, the recesses 263a and 264a begin from the distal end of the notch 260 near the adjacent pole 251, and therefore, there is no risk of the above described interference problem.

Figure 9:
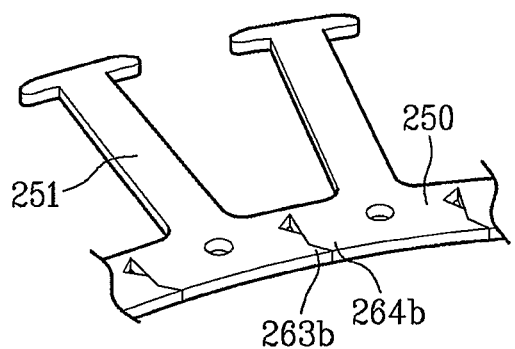
FIG. 9 is a perspective view illustrating a bent state of a core iron plate according to a preferred fourth embodiment of the present invention.

FIGS. 8 and 9 illustrate alternative cut surfaces and recesses.

Referring to FIG. 8, contact portions of both the cut surfaces may have a curved shape. Specifically, one of the pair of contact cut surfaces has a protruded portion 263b, and the other cut surface has a recessed portion 264b for the insertion of the protruded portion 263b.

When a tangential line defined by the contact cut surfaces has a straight shape as shown in FIG. 7, the contact portions of the cut surfaces may be slipped relative to each other by a rotation-repulsive force. However, when the tangential line has a curved shape as shown in FIGS. 8 and 9 by virtue of the protruded portion 263b and the recessed portion 264b, there is no risk of a slippage.

Here, the protruded portion 263b and the recessed portion 264b support each other, to resist against the rotation-repulsive force, thereby reducing the deformation risk of the base 250. Alternatively, as shown in FIG. 9, one of the cut surfaces of each notch is formed with a recess, but the other cut surface has no recess. Accordingly, in the alternative embodiment, a hole defined by the recess after the winding of the core iron plate has a triangular shape.

Although not shown, the recess may have a semi-circular shape. In this case, if the cut surfaces are formed with the recesses, respectively, a hole defined by the recesses after the winding of the iron core plate has a circular shape. Alternatively, if only one of the cut surfaces is formed with the recess in the same manner as FIG. 9, a semicircular hole may be defined by the recess.

Figure 10:
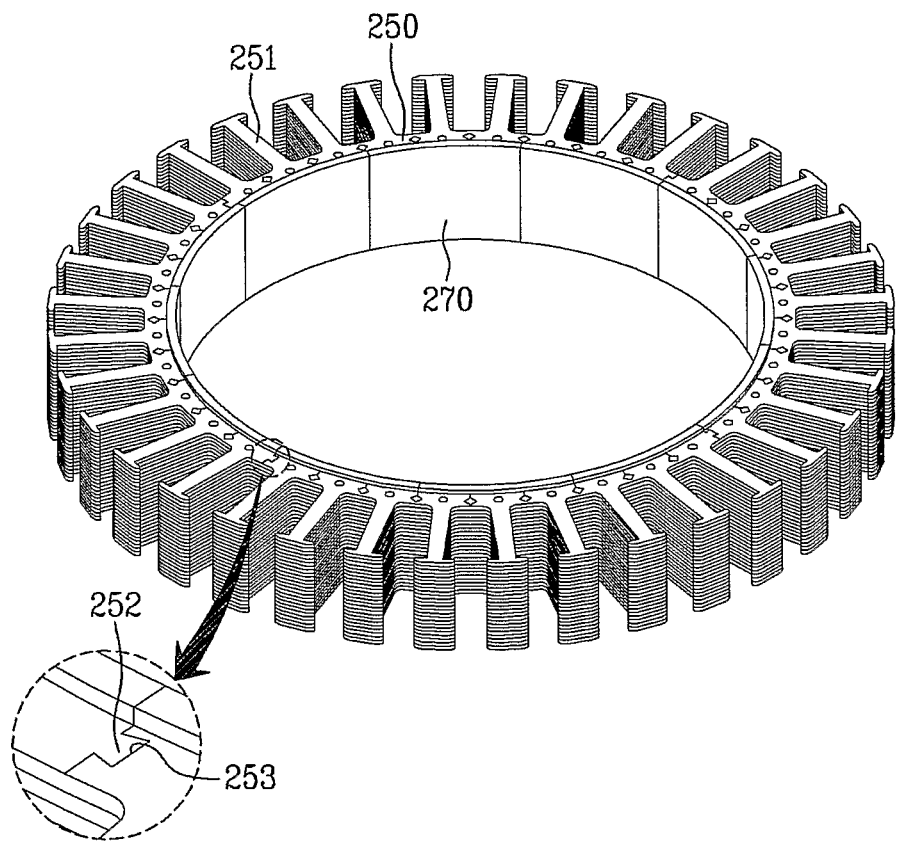
FIG. 10 is a perspective view illustrating a stator core, which is formed by stacking core iron plates according to the second embodiment of the present invention.

FIG. 10 illustrates a stator core, which is completed by winding the core iron plates as shown in FIG. 7. In the stator core shown in FIG. 10, after completing the winding of the core iron plates, reinforcing members 270 are coupled to an inner periphery (See reference numeral 250a of FIG. 11) of the bases 250 of the core iron plates.

Figure 3:
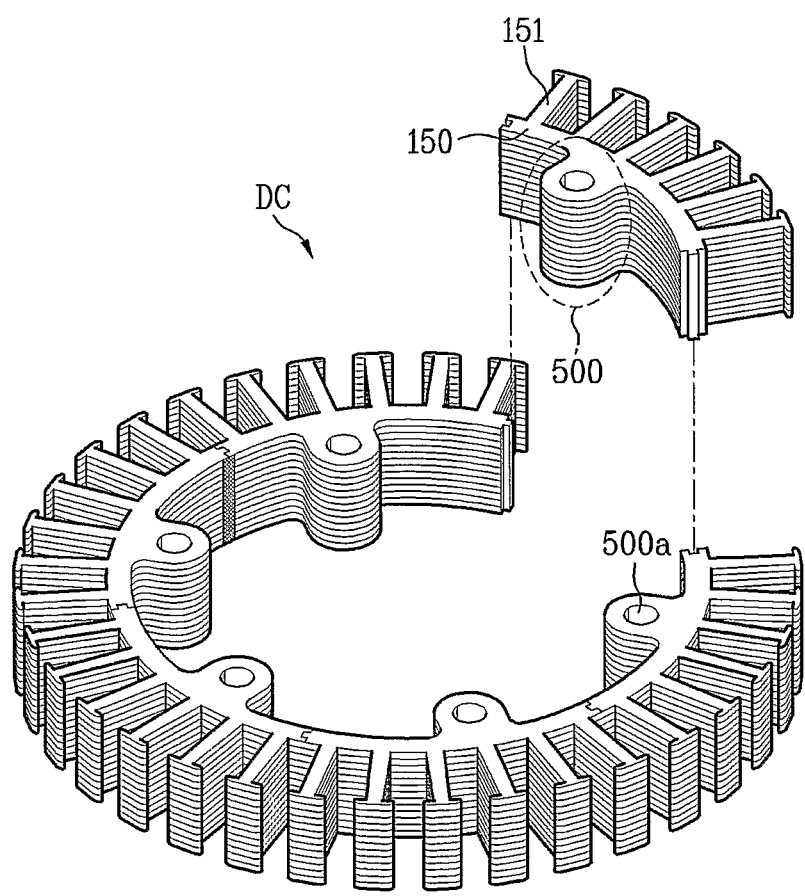
FIG. 3 is a perspective view illustrating a stator core shown in FIG. 2.

The stator core shown in FIG. 10 has a dividable core shape. Specifically, after preparing four unit cores each occupying an angular range of 90 degrees, the unit cores are assembled to one another by use of assembling recesses 253 and assembling protrusions 252 thereof, in the same manner as the previously described conventional dividable core shown in FIG. 3. Each unit core can be obtained by winding and stacking a plurality of core iron plates each having a length to occupy an angular range of 90 degrees.

The stator core of the present invention as shown in FIG. 10 has no the waste of materials as represented by the conventional dividable core. Further, since the stator core is fabricated by winding a plurality of core iron plates having a relatively short length, there is no need for large-size winding equipment.

Figure 11:
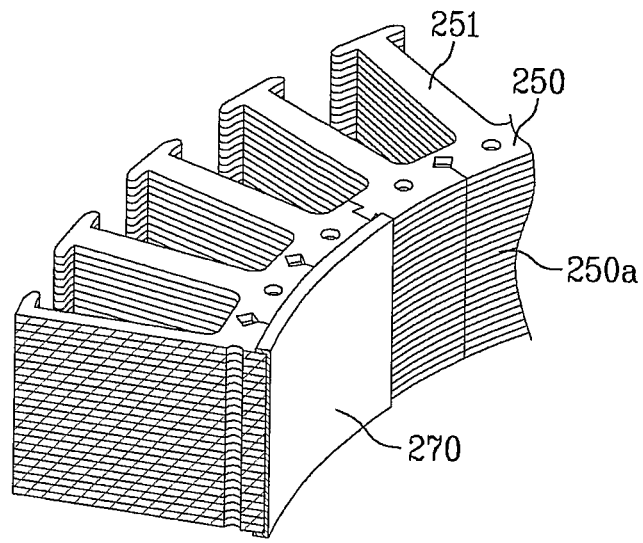
FIG. 11 is a partial perspective view illustrating an embodiment of a reinforcing member shown in FIG. 10.

FIG. 11 illustrates the reinforcing member 270 shown in FIG. 10 in more detail.

The reinforcing member 270 is coupled to the bases 250 to cover the inner periphery 250a of the bases 250 and partial upper and lower surfaces of the uppermost and lowermost bases 250. Preferably, the reinforcing member 270 is made of a metal material, and is welded to the bases 250.

Figure 12:
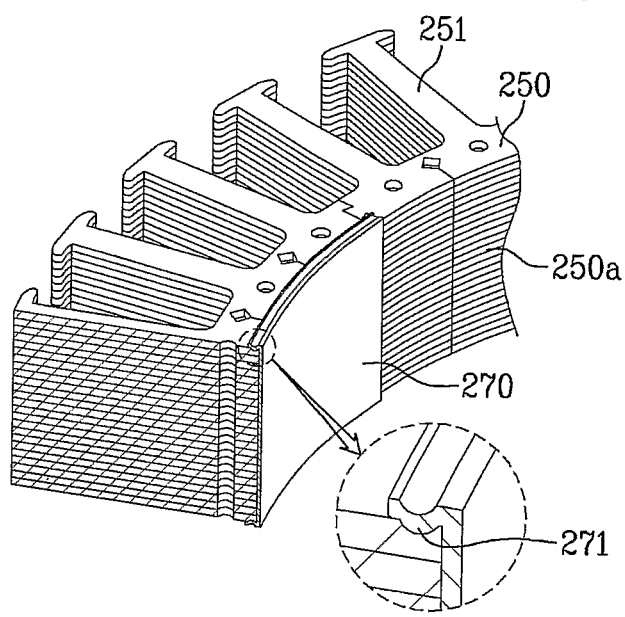
FIG. 12 is a partial perspective view illustrating another embodiment of the reinforcing member shown in FIG. 10.

FIG. 12 illustrates another embodiment of the reinforcing member 270. As shown, the reinforcing member 270 is formed with press^tting portions 271 to be presetted into the uppermost and lowermost ones of the bases 250.

Figure 13:
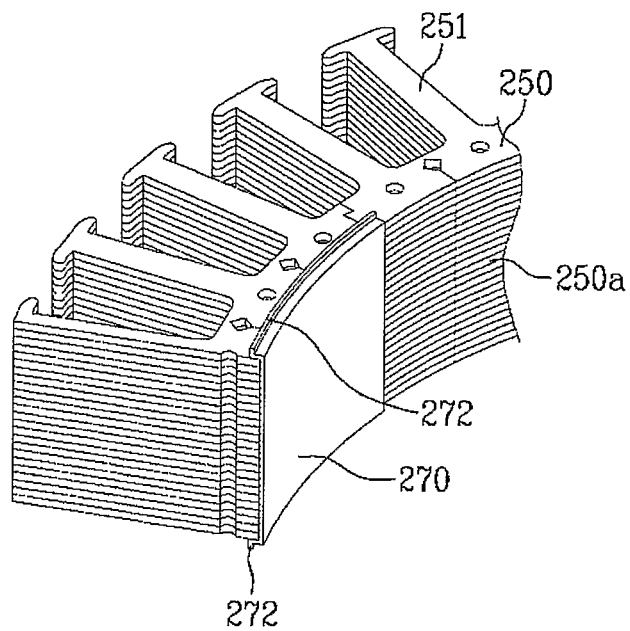
FIG. 13 is a partial perspective view illustrating yet another embodiment of the reinforcing member shown in FIG. 10.

FIG. 13 illustrates yet another embodiment of the reinforcing member 270. In FIG. 13, the reinforcing member 270 has outwardly bent distal ends 272. Since the reinforcing member has a weak point in distal ends thereof, by providing the distal ends of the reinforcing member with the press-fitting portions 271 as shown in FIG. 12, or providing the reinforcing member with the outwardly bent distal ends 272 as shown in FIG. 13, the reinforcing member 270 can achieve a high strength at the distal ends thereof.

Figure 1:
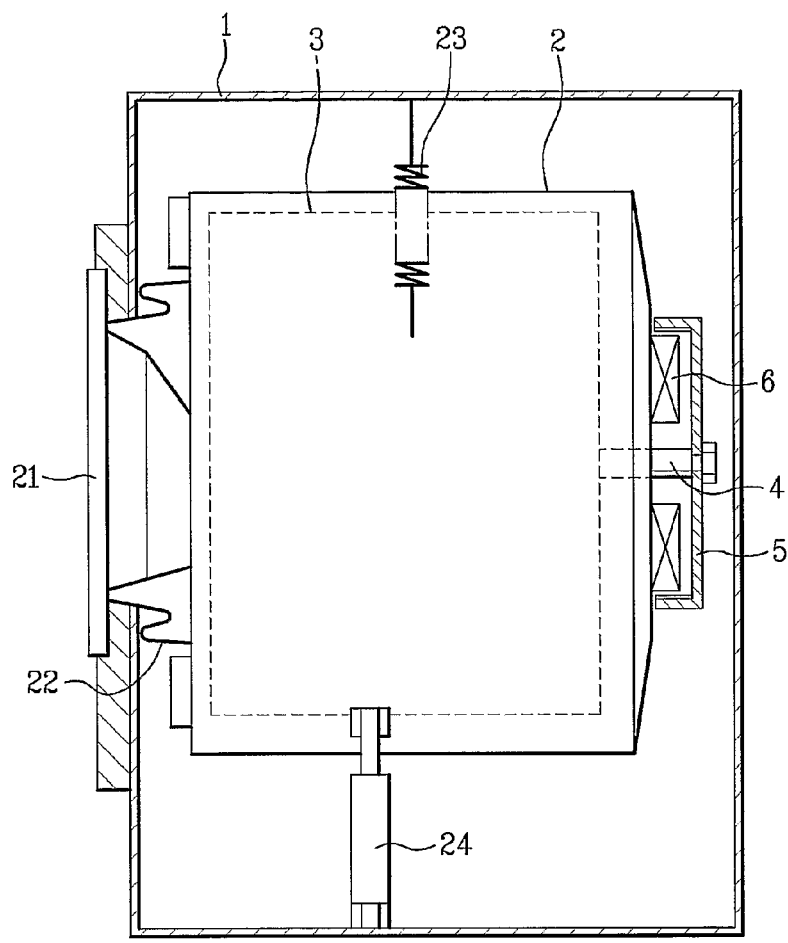
FIG. 1 is a sectional view illustrating a conventional washing machine.
Figure 2:
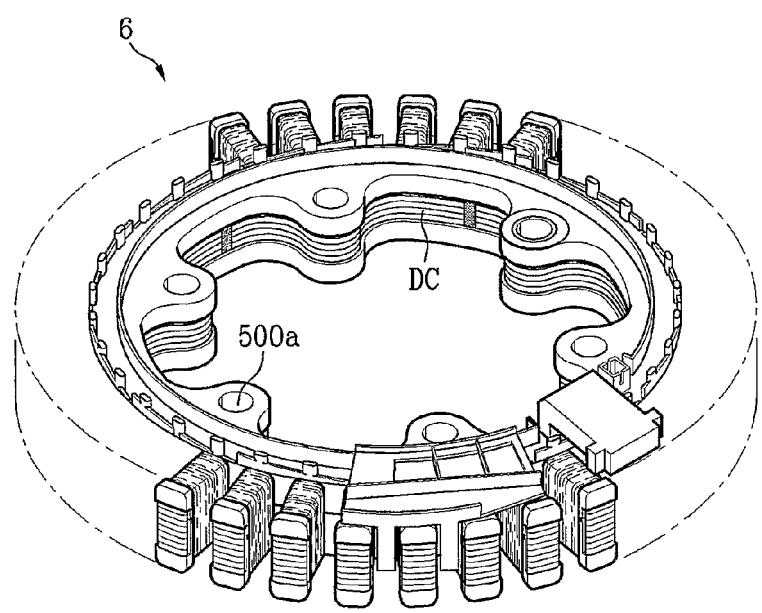
FIG. 2 is a perspective view illustrating a conventional stator.
Figure 14:
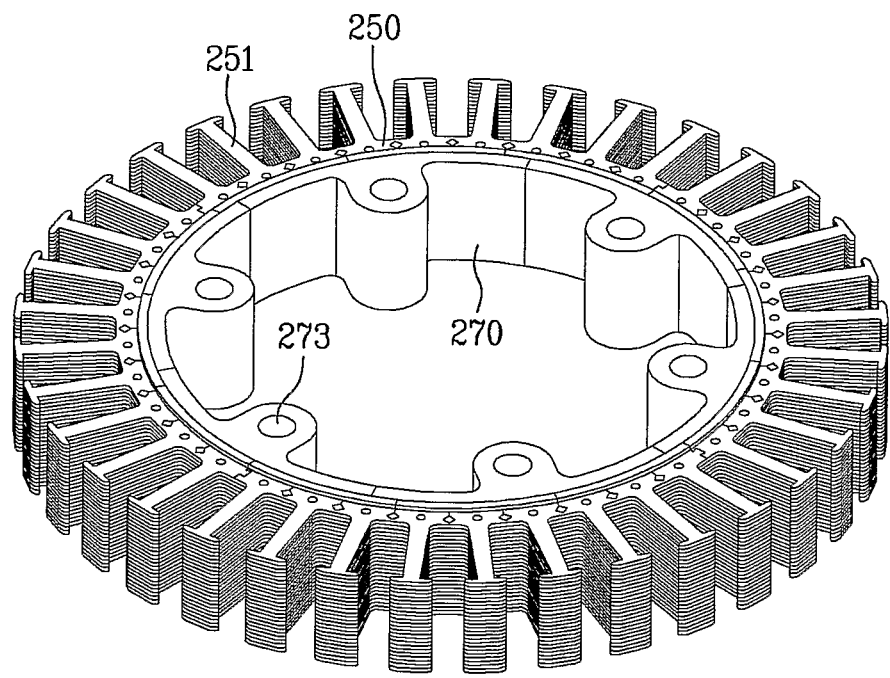
FIG. 14 is a partial perspective view illustrating yet another embodiment of the reinforcing member shown in FIG. 10.

Meanwhile, in the direct-connection type drum washing machine as shown in FIG. 1, a stator is coupled to a rear side of a tub by use of bolts. For the fastening of the bolts, the reinforcing member 270 may have bolt fastening holes 273 for the penetration of the bolts. This is well shown in FIG. 14.

The present invention is also related to a washing apparatus having the stator core as described above. The stator core has the above described configuration, and other configurations of the washing apparatus are identical to those of a conventional washing apparatus. Therefore, a detailed description thereof is omitted herein.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

As apparent from the above description, the present invention provides a stator of a motor for use in a washing apparatus having the following effects.

Firstly, according to the present invention, a plurality of core iron plates can be punched, in two rows, from a single electric steel plate. This has the effect of reducing the waste of materials, in the same manner as the prior art.

Secondly, the core iron plates of the present invention can assure a more simplified winding thereof, and may have a dividable core structure consisting of unit cores to be assembled with one another.

Thirdly, the present invention has no need for large-size winding equipment that is required by the previously described conventional spiral core.

The invention claimed is:

1. A washing apparatus having a motor for rotating a drum receiving laundry therein,
wherein a stator core of the motor includes a plurality of bases stacked one above another after being wound, each base having a plurality of poles formed at one side surface thereof and a plurality of notches formed at the other side surface thereof, and
at least one reinforcing member for reinforcing the strength of the stator core and binding the plurality of bases stacked one above another,
wherein each base is divided into at least two parts to be assembled with one another,
wherein the at least one reinforcing member is coupled to an inner periphery of the stacked bases and partial upper and lower surfaces of the uppermost and lowermost stacked bases, and
wherein distal ends of the reinforcing member are provided with press-fitting portions protruded toward the uppermost and lowermost stacked bases or outwardly bent to strengthen the distal ends thereof.

2. A stator of an electric motor comprising:
a stator core including a plurality of bases stacked one above another after being wound, each base having a plurality of poles formed at a first side surface thereof and a plurality of notches formed at a second side surface thereof; and
at least one reinforcing member for reinforcing the strength of the stator core and binding the plurality of bases stacked one above another,
wherein each base is divided into at least two parts to be assembled with one another
wherein the at least one reinforcing member is made of a metal material and coupled to an inner
periphery of the stacked bases and partial upper and lower surfaces of the uppermost and lowermost stacked bases, and
wherein distal ends of the reinforcing member are provided with press-fitting portions protruded toward the uppermost and lowermost stacked bases or outwardly bent to strengthen the distal ends thereof.

3. The stator according to claim 2, wherein facing cut surfaces of each notch come into at least partial contact with each other to allow the second side surface of the base having the notches to form a continuous surface when the base is wound.

4. The stator according to claim 3, wherein each notch is located between the respective neighboring poles formed at the base.

5. The stator according to claim 4, wherein the notch is formed at the second side surface of the base opposite to the first side surface of the base having the poles.

6. The stator according to claim 5, wherein at least one of the cut surfaces of the notch has a recess.

7. The stator according to claim 6, wherein the recess forms from a distal end of the cut surface opposite to the second side surface of the base having the notches.

8. The stator according to claim 6, wherein both the cut surfaces of the notch have recesses, respectively.

9. The stator according to claim 6, wherein the recess has a polygonal or semi-circular shape.

10. The stator according to claim 6, wherein the cut surfaces have a curved shape.

11. The stator according to claim 10, wherein one of contact portions of both the cut surfaces is formed with a protruded portion, and the other contact portion is formed with a recessed portion corresponding to the protruded portion.

12. The stator according to claim 2, wherein the base has assembling recesses and assembling protrusions.

13. The stator according to claim 2, wherein the reinforcing member is coupled to the bases by welding.

14. The stator according to claim 2, wherein the reinforcing member has coupling portions formed with coupling holes for coupling the stator.

15. The stator according to claim 2, wherein the reinforcing member comprises a plurality of reinforcing members.

16. The stator according to claim 2, wherein the at least one reinforcing member is made of a metal material.

* * * * *